United States Patent [19]

McCool

[11] Patent Number: 4,979,167
[45] Date of Patent: Dec. 18, 1990

[54] METHODS AND APPARATUS FOR PERFORMING RESTRICTED TOKEN OPERATIONS ON AN FDDI NETWORK

[75] Inventor: John F. McCool, Cupertino, Calif.

[73] Assignee: Advanced Micro Devices, Inc., Sunnyvale, Calif.

[21] Appl. No.: 278,724

[22] Filed: Dec. 2, 1988

[51] Int. Cl.⁵ .......................... H04J 3/00; H04J 3/14; H04J 3/16
[52] U.S. Cl. .................................. 370/85.4; 370/85.5; 370/85.12; 370/85.7; 340/825.05
[58] Field of Search ...................... 370/86, 88, 89, 94, 370/4, 85.5, 85.4, 85.6, 85.12; 340/825.05, 825.5, 825.51

[56] References Cited

U.S. PATENT DOCUMENTS 4,482,99 11/1984 Janson et al. .......................... 370/86
4,713,807 12/1987 Caves et al. ........................... 370/94
4,726,018 2/1988 Bux et al. .............................. 370/89
4,731,784 3/1988 Keller et al. .......................... 370/89
4,736,368 4/1988 Szczepanek .......................... 370/89

Primary Examiner—Douglas W. Olms
Assistant Examiner—Min Jung
Attorney, Agent, or Firm—H. Donald Nelson; Mikio Ishimaru; Stephen A. Becker

[57] ABSTRACT

Methods and apparatus are set forth for utilizing the restricted token operations on an FDDI network. Two service primitives are defined to facilitate the control of restricted dialog. The first defines what class of token can be captured for the purpose of transmitting asynchronous data. Secondly, a primitive is defined for use at the end of each transmit request to give control over the token type that will be issued at the end of a given transmission. A hardware protocol is defined which provides reliable control over these two parameters, together with methodology for linking frames in a buffer memory during restricted operation. The combination of the hardware protocol and methodology allows restricted dialog to be realized without real-time software interaction.

23 Claims, 6 Drawing Sheets

TABLE

| MA__TOKEN REQUEST | MA__DATA REQUEST (TOKEN__CLASS) | MODE/STATE |
|---|---|---|
| O | I | ENTER RESTRICTED TOKEN MODE |
| I | I | RESTRICTED TOKEN MODE |
| I | O | EXIT RESTRICTED TOKEN MODE |
| O | O | OFF |

| TABLE KEY |
|---|
| O = NONRESTRICTED |
| I = RESTRICTED |

METHODS AND APPARATUS FOR PERFORMING RESTRICTED TOKEN OPERATIONS ON AN FDDI NETWORK

BACKGROUND OF THE INVENTION

1. Field of the Invention

The invention generally relates to methods and apparatus used in Fiber Distributed Data Interface (FDDI) timed token ring networks to accommodate restricted dialog between preselected stations in the ring. More particularly, the invention relates to methods and apparatus which allow both restricted and nonrestricted token operations to be performed utilizing a hardware protocol implemented by the media access control means associated with each station, coupled with a method of frame linking during restricted operations, wherein said hardware protocol and method of frame linking can be realized without the need for real time software intervention.

2. Description of the Related Art

FDDI token ring networks are well known to those skilled in local area network technology. FDDI is a result of American National Standards Committee X3T9 and grew from the need for high speed interconnection among main frames, minicomputers and associated peripherals. It supports a variety of front-end, back-end and backbone networks configured in a variety of topologies and provides for secure 100 and 200 megabit per second transmission across long distance links (e.g., 100 km), with excellent immunity to the effects of electrical radiation and common mode voltages.

In order to appreciate the context in which the restricted dialog accommodated by the invention takes place, a brief description of the structure of an FDDI token ring network will first be set forth.

At least part of the rationale behind organizing FDDI as a ring is based on the nature of optical communication. Bus and passive star topologies would require the optical transmission to be detected at several sources simultaneously. Although fiber-optic taps are currently becoming available, the optical attenuation caused by such a device would severely restrict the number of nodes on the network.

Fiber-optic communication is still best suited for point-to-point transmission. Two types of Local Area Network (LAN) topologies can be realized with point-to-point links: the active hub star and the ring. Active stars introduce a single failure point that can disable the entire LAN. Single-ring networks also are prone to failures at any node. FDDI alleviates this problem with the dual-ring approach.

An FDDI ring typically comprises a variety of station types. Class A stations connect to both the primary and secondary rings of the network and are often referred to as "dual attachment stations". Data flows in opposite directions on the two rings. The Class A station can act as a wiring concentrator, serving to interconnect several single-attachment or Class B stations to the ring. Wiring concentrators give the network administrator a single maintenance point for a large number of stations. Class B Attachments trade lower implementation costs and ease in servicing against the fault tolerance afforded in a Class A station.

The FDDI defined in X3T9 relates to the lower layers of the Open Systems Interconnection/International Organization for Standardization (OSI/ISO) model as follows:

The lowest layer of the OSI model, the Physical Layer, is described in two documents. The first, the FDDI Physical Medium Dependent (PMD) document, details optical specifications for FDDI. PMD defines the wavelength for optical transmission, the fiberoptic connector employed, and the function of the optical receiver. PMD also details an optional optical by-pass switch that can be incorporated within a station.

The second document describes the FDDI Physical Sublayer (PHY) which is the upper sublayer within the OSI Physical Layer. PHY defines the 4B/5B group-encoding scheme used to represent data and control symbols on the network. PHY also describes the method for retiming transmission within the mode.

The Data Link Layer in the OSI model is often subdivided into two sublayers: Link Layer Control (LLC) and Media Access Control (MAC). FDDI defines the lowest of these sublayers, MAC.

The FDDI MAC protocol distinguishes two classes of service for data transmission; synchronous and asynchronous. Synchronous class guarantees transmission on a per token basis while asynchronous transmission is provided as bandwidth is available on the network. Furthermore, the FDDI MAC protocol provides a restricted token operation mode that allows a limited number of stations to utilize all the bandwidth not reserved for synchronous transmission. These few stations use all this remaining bandwidth to the exclusion of all other stations on the network. Control of the restricted dialog is not defined in the FDDI standards.

Accordingly, it would be desirable if methods and apparatus were available to control restricted dialog on an FDDI token ring network.

Software is one vehicle by which methods could be developed to control parameters that conceptually facilitate restricted token operations. Practically, however, software control of parameters which facilitate the implementation of restricted token operations would be difficult since the software would have to interrupt on token arrivals to manipulate the parameters.

As a result, it would be desirable if a hardware protocol could be developed that would provide reliable control over parameters which could be specifically defined to facilitate restricted token operation. Furthermore, if such a protocol could be coupled with a method for linking frames in buffer memory during restricted operation, restricted dialog could be realized without real time software intervention.

Additionally, it would be desirable if the system designed to facilitate restricted token operation prevented cases where a restricted token is not properly reconverted or an unrestricted token is converted to a restricted type through noise on the ring. The system should at the same time prevent recovery of the ring to its normal unrestricted state prior to completing restricted dialog.

SUMMARY OF THE INVENTION

According to the invention methods and apparatus are set forth for utilizing the restricted token operation on the FDDI network. Two service primative are defined to facilitate the control of restricted dialog. The first defines what class of token can be captured for the purpose of transmitting asynchronous data. Secondly, a primitive is defined for use at the end of each transmit request to give control over the type of token that will be issued at the end of a given transmission. The invention includes a hardware protocol that provides reliable control over these two parameters, together with methodology for linking frames in a buffer memory during restricted operation. The combination of the hardware protocol and methodology allows restricted dialog to be realized without real-time software interaction.

In accordance with the invention hardware at the MAC level is designed to manipulate the two new primatives. A state machine having four states: "OFF"; "ENTER RESTRICTED TOKEN MODE"; "RESTRICTED TOKEN MODE" and "EXIT RESTRICTED TOKEN MODE", controls the parameters. Node processor software is able to enter any given state by issuing an instruction to the MAC. The OFF state is the default setting for the MAC and is entered upon reset.

An initiating station wishing to enter a restricted dialog, waits until an asynchronous queue associated with the station is cleared. Messages addressed to each participant in the restricted dialog are placed on the asynchronous queue. These messages inform the participants that they may enter into restricted dialog. The initiator then sets the MAC to the ENTER RESTRICTED TOKEN MODE state and issues an instruction to transmit the asynchronous queue The initiator's frames will be transmitted on the first unrestricted token opportunity. After their transmission, a restricted token is released. The initiator's MAC will automatically enter the RESTRICTED TOKEN MODE state when the token is issued. This will allow the initiator to capture subsequent restricted tokens for asynchronous transmission. Eventually, the participating stations will parse the message received from the initiator indicating successful entry into restricted token operation. At this point, the participants can directly force their MACs to the RESTRICTED TOKEN MODE state through a software instruction.

At the end of the restricted dialog, the particpants send a message to the terminating station indicating they are leaving RESTRICTED TOKEN MODE state. As soon as the message is sent, the participant programs the MAC to the OFF state. Once the terminating station receives the final messages from the participants, it queues a final asynchronous frame and programs the EXIT RESTRICTED TOKEN MODE state of the MAC. The restricted token is captured, the message is transmitted and an unrestricted token is issued.

It is an object of the invention to be able to utilize the restricted token operation on an FDDI network using a hardware protocol that reliably controls parameters specifically defined to facilitate restricted token operation.

It is a further object of the invention to be able to accomplish the aforestated objective without requiring real time software intervention.

The invention features methods and apparatus that prevent improper conversion between restricted and non-restricted states on account of noise or prior to completion of restricted dialog.

These and other objects and features of the invention will be readily apparent to those skilled in the art in view of the detailed description taken in conjunction with the various figures of the Drawing set forth hereinafter.

DETAILED DESCRIPTION

Figure 1:
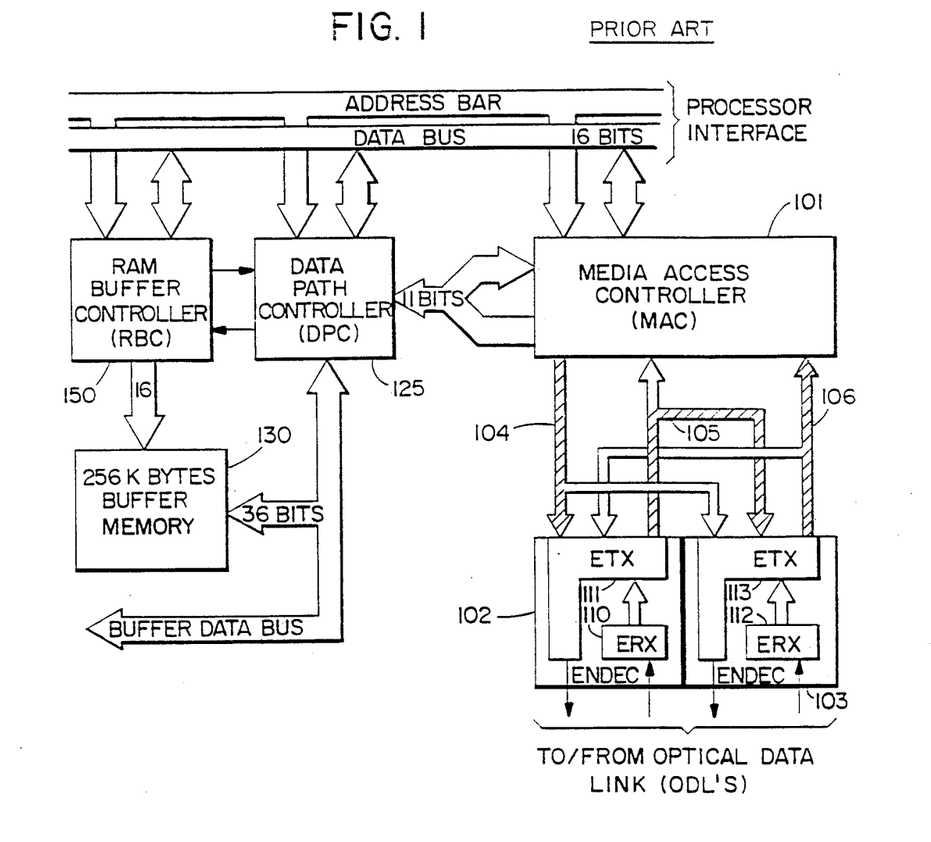
FIG. 1 depicts an FDDI configuration corresponding to an FDDI Class A station.

FIG. 1 depicts an FDDI configuration corresponding to an FDDI Class A station suitable for engaging in restricted dialog with other stations on a token ring.

For the sake of completeness FDDI data flow will be reviewed with reference to FIG. 1 (prior art) in order to identify the cooperating station components utilized to implement the invention.

The station depicted in FIG. 1 is connected to both a primary and secondary ring, thereby requiring a pair of PHY and PMD devices. The upper physical sublayer, PHY, defines the method for clock and data synchronization, data encoding and symbol alignment. The Encoder/Decoder (ENDEC) Receiver (also refered to hereinafter as an ERX) and ENDEC Transmitter (ETX), shown in FIG. 1 as units 110 and 111 respectively (in ENDEC 102), and as units 112 and 113 respectively (in ENDEC 103), join to execute the PHY protocol.

Suitable ENDEC logic for accomplishing this function is described in U.S. Pat. No. 4,703,486, hereby incorporated by reference, issued Oct. 27, 1987 to Bemis, assigned to the same assignee as this invention.

The ERXs convert a 4B/5B code bit stream into the proper FDDI symbols and aligns them with the local clock. The ETXs reverse the process, converting symbols into a serial code bit output.

FIG. 1 details the bus interconnects between the MAC, shown as device 101, and ENDECs 102 and 103. The cross hatched busses, 104, 105 and 106, represent the data paths selected when the ring is fully configured.

The function of the different elements can be best understood by following the data flow through the node. The optical data stream is converted to psuedo-ECL signal levels in a fiber optic receiver module. An optical receiver conforming to FDDI must be capable of reliably converting the optical signal over a broad power range. This requirement stems from the fact that the adjacent FDDI stations could be positioned as close as the next desk top or as far as 2 km.

The ENDEC Receiver processes data received serially from the optical data link. Using the recovered clock, the data stream is converted to NRZ and fed to a serial to parallel converter. Here, control logic is used to detect the packet start delimiter sequence, JK . The combination of the J and K symbols can be uniquely recognized in the serial bit stream and will not be generated by arbitrary combinations of other valid code symbols. Thus, the JK pattern is used in FDDI to establish the byte synchronization for the received frames.

Once a JK is detected, received bytes are loaded into an elastic buffer (located in the ENDEC transmitter) to compensate for the mismatch in station frequencies. In FDDI, all stations transmit information at their own local frequency. Station frequencies can vary by as much as 50 ppm from 125 Mhz. The elastic buffer compensates by providing enough storage to accommodate reception of the largest FDDI frame when the difference in station frequencies is at its peak. Frequency differences are accounted for during the idle field between frames where the receiving station can add or delete idle symbols as required.

After the data is byte aligned and synchronized to the local clock, it is transferred to the ENDEC Transmitter device. Here, the data stream is processed to derive the FDDI line states. Line states are simply a predefined sequence of FDDI symbols which are used by station management to assess the quality of a physical connection. In FDDI, a physical connection is formed by the PHY and PMD entities in two adjoining stations. Using both the primary and secondary fibers two adjacent stations can perform a simple line state handshake on initialization to test the integrity of the physical connection. This process is known as connection management (CMT).

The received data is routed through the ENDEC transmitter to MAC 101. MAC 101 constantly monitors the received data stream. If MAC 101 is not holding the token, frames received are repeated on the MAC's X-bus (shown in FIG. 1 as the MAC 101 output to the ENDEC devices). At the end of each frame a status field is transmitted. This status field is made up of R (reset) and S (set) symbols. The sourcing station transmits three R symbols after the frames end delimiter to form an Error, Address Recognized and Copy indicator. MAC 101 manipulates these indicators during frame repetition. The Error indicator is converted to an S symbol if the MAC detects a cyclic redundancy check (CRC) error or length violation. The Address Recognized indicator is set if the destination address of the frame matches the corresponding address in an internal MAC register. Finally, the Copy indicator is set if the address is recognized and the frame is copied to buffer memory.

In addition to repeating the frame, MAC 101 will send the frame to the Data Path Controller (DPC), shown in FIG. 1 and unit 125, to be stored in the buffer memory, shown as unit 130. Received frames are output on the MAC's YR-bus, shown in FIG. 1 as the bus interconnecting MAC 101 and DPC 125. DPC 125 stores the received bytes in an internal FIFO and sends a request to a RAM Buffer Controller (RBC), shown in FIG. 1 as device 150, for access to buffer memory 130. DPC 125 places four bytes of data from the FIFO onto the D-bus when the acknowledgement is received from RBC 150. RBC 150 simultaneously presents the correct address and control signals for the memory write operation.

Functionally, DPC 125 and RBC 150 operate together to perform the memory buffer management function for a high-speed interface. The RBC and DPC combination implement a number of features that simplify and minimize the processors intervention with the high-speed interface. The processor can be interrupted when each frame is transmitted or when a group of frames (a chain) is transmitted. On reception, frames are stored contiguously in a dedicated portion of the buffer memory. For transmission, the scheme allows frames to be scattered across memory using a linked list scheme which will be described hereinafter.

Although the DPC and RBC units themselves fall outside the scope of the invention, a detailed description of how these units cooperate within a station, to achieve the objects of the invention, will be set forth hereinafter.

Buffer memory 130 of FIG. 1 is coupled to the network. According to the preferred embodiment of the invention, RBC 150 generates the buffer memory addresses and control signals. RBC 150 arbitates buffer access between the network (DPC) and a processor (e.g. a host or node processor). With a memory bandwidth of 200 Mbps, received packets can be transferred to the host while frames continue to be received from the ring.

Figure 2:
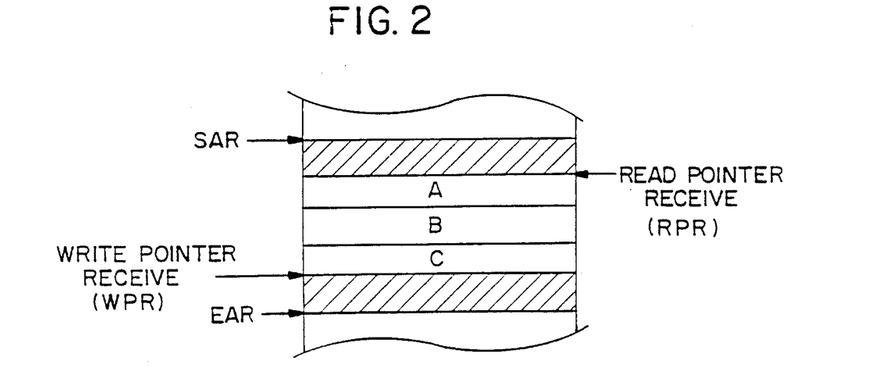
FIG. 2 depicts the buffer memory receive queue for the station depicted in FIG. 1.

The buffer memory receive queue has a FIFO organization which is depicted in FIG. 2. According to the preferred embodiment of the invention, the memory limits of the FIFO, SAR (Start Address Receive) and EAR (End Address Receive), are programmed into RBC 150 on initialization. These pointers are illustrated by the address labels SAR and EAR in FIG. 2. RBC 150 maintains a number of pointers that are used to access the receive queue. The WPR (Write Pointer), also shown in FIG. 2, stores the address of the location in memory where the network data will be written. A shadow WPR pointer is maintained that points to the beginning of each received packet. This pointer is useful for two reasons. First, this location is rewritten once the packet is successfully received with status and length information. Secondly, if the packet is not complete or the destination address doesn't match the station address the shadow WPR can be used to reload WPR so the received data can be overwritten.

A Read pointer for Host reads from the receive queue is also depicted in FIG. 2 as RPR.

Figure 3:
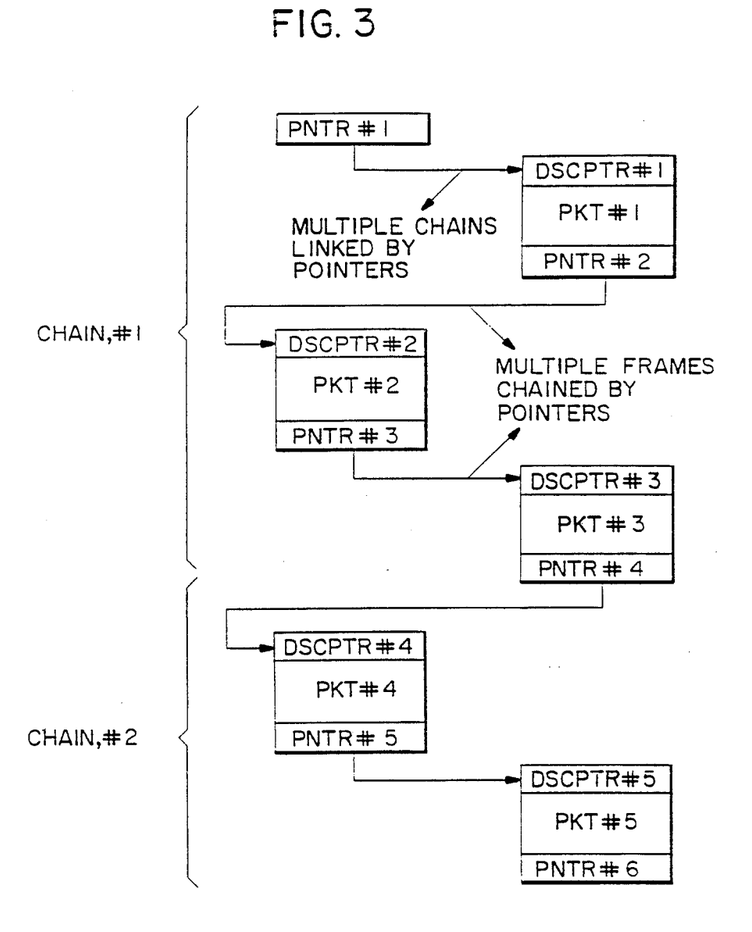
FIG. 3 depicts the structure of data queued for transmission in the station depicted in FIG. 1.

The structure for data queued for transmission is illustrated in FIG. 3. Instead of a FIFO, the transmit data uses a linked list approach. RBC 150 and DPC 125 are designed to accommodate two identical transmit structures, providing independent queues for FDDI's two classes of transmission service.

FIG. 3 shows two transmit chains within a single queue. In chain 1, a pointer directs RBC 150 to the location of the first descriptor. The descriptor is followed by the first frame. Each frame is followed by a pointer to the location of the next frame. When the pointer is accessed RBC 150 loads the pointer value into a first register, RPXS, used to store the location being read from the synchronous queue. A second register, RPXA, provides the same function for the asynchronous queue.

An additional pointer, WPX (Write Pointer Transmit) stores the current memory location being written by the host for data transmission. RBC 150 increments WPX on each host write to memory.

The transmit descriptors pass packet length and control information to RBC 150 and DPC 125. Two control bits, MORE and XDONE, give the linked list scheme considerable flexibility. MORE is set indicating more frames on the queue. XDONE is set to indicate to the MAC 101 the completion of a transmit request thereby forcing release of the token.

The station depicted in FIG. 1 facilitates buffer memory access by up to two independent devices, a host and node processor. The node processor is used to control and initialize the station. The host interface is designed for the transfer of data to and from system memory.

As indicated hereinbefore, the RBC 150 acts as the buffer memory arbitrator. According to one embodiment of the invention, RBC 150 executes a 32-bit memory transfer cycle in 160 ns. Every 160 ns RBC 150 arbitrates access between the DPC node processor and host. The host interface has two inputs to the RBC, a host read request and a host write request. Both host requests are acknowledged with independent host read acknowledge and host write acknowledge outputs. During the host read operation the content of the RBC RPR register is placed on the address output and its value replaced to point to the next location. During a host write the WPX is similarly manipulated.

The node processor interface provides a mechanism for random access of buffer memory 130. The RBC maintains a MAR (Memory Address Register) specifically for node processor memory transfers. The node processor can access the buffer through hardware or software. The hardware scheme is similar to the host interface. The node processor requests a read or write memory access via the RBC. The RBC has two outputs used to indicate access acknowledgement. During a node processor access the content of MAR is placed on the address bus. With a software access the read and write requests are issued as instructions to the RBC. On a write, the MAR is placed on the buffer memory address bus. The content of the DPC's MDR (Memory Data Register) is placed on the data bus. On a software read operation MDR is loaded with the value on the data bus.

Once a linked list is formed in the buffer memory, the node processor initiates transmission by issuing an instruction to DPC 125. There are separate instructions for transmitting the synchronous and asynchronous queue. The first packet in the linked list that has the MORE descriptor bit reset constitutes a chain.

FIG. 3 shows a linked list comprised of two chains. The DPC will transmit up to packet 3, the end of the first chain. Transmission of chain 2 requires a second transmit instruction to DPC 125. These transmission instructions can be pipelined two deep. In other words, the node processor need not wait for transmission of chain 1 before instructing transmission of chain 2. This technique helps facilitate uninterrupted frame transmission.

When an instruction is given to transmit a queue DPC 125 responds by asserting a media request signal to MAC 101. MAC 101 will capture the token based on internal timer values and the type of data queued for transmission. Once MAC 101 captures the token it responds to the DPC's transmission request with a media available signal. At this point DPC 125 begins to load its internal FIFO and transmission can commence.

MAC 101 is responsible for insuring that the transmitted frame is preceded by the correct preamble. MAC 101 appends the frame start delimiter, CRC value and delimter and frame status field to the information received from DPC 125. These symbols are transmitted to the ENDEC transmitter over the X-bus. The ENDEC encodes these symbols and serially shifts them to the optical transmitter.

Having described data flow through the station depicted in FIG. 1, the invention can now be described in the context of the architecture, buffer memory scheme and link list capabilities described with reference to FIGS. 1-3.

According to the invention, as indicated hereinbefore, two service primitives can be utilized to facilitate and control restricted dialog. First, a primitive called "MA_TOKEN request" can be defined as an input which is used to define what class of token can be captured for the purpose of transmitting asynchronous data. Second, a "MA_DATA request (token class)" parameter at the end of each transmit request can be used to give control over what type of token will be issued at the end of transmission.

Furthermore, according to the invention, a hardware protocol is implemented in MAC 101, of FIG. 1, to provide reliable control over these service primitives.

Coupled with the aforementioned capability of linking frames in the buffer memory and a method for doing so during restricted operation, restricted dialog can be realized without real-time software intervention.

Figure 7:
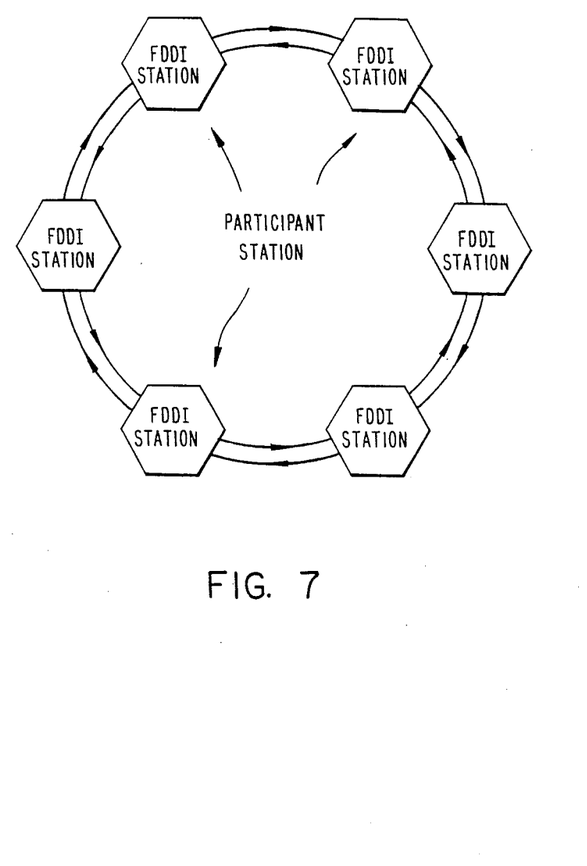
FIG. 7 illustrates a network containing a plurality of individual stations.

Stations capable of transmitting asynchronous frames during a restricted token dialog can be defined as either an initiator, a terminator, or a participant station. FIG. 1 depicts an example of station that could serve as any of these stations. FIG. 7 illustrates a network of several stations.

Restricted token operation begins with one station (the initiator) requesting asynchronous transmission using an unrestricted token. The token class requested for transmission at the end of the asynchronous transmission is restricted. By requiring the capture of an unrestricted token before initiating a restricted dialog, conflicting restricted dialogs are prevented.

Once an unrestricted token has been captured and subsequently issued as a restricted token, participants in the dialog can now use MA_TOKEN request to capture restricted tokens for the purpose of transmitting asynchronous frames. When the dialog is complete, all stations must use MA_TOKEN request to disable their ability to capture the restricted token for asynchronous transmission. One of these stations, the terminator, must first issue an unrestricted token to return the ring to normal operation.

One additional requirement is necessary when using restricted dialog in a FDDI network. To prevent cases where a restricted token is not properly reconverted or an unrestricted token is converted to a restricted type through noise on the ring, the FDDI MAC timer (located within MAC 101) is not reset on restricted tokens. This will force a claim process if no other valid transmission occurs while the restricted token is present. To prevent recovery, at least one station involved in the restricted token process should transmit a frame on each rotation of the token.

Figure 4A:
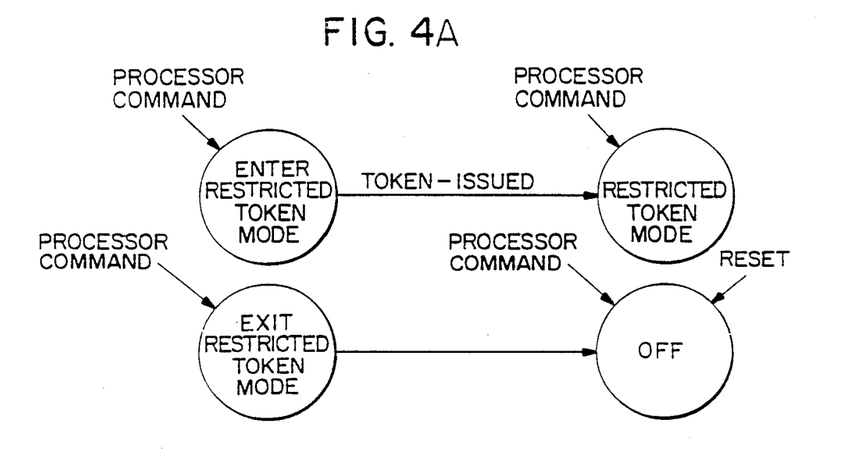
FIG. 4(a) depicts the state machine equivalent of the logic added to the Media Access Controller (MAC) of FIG. 1 to manipulate the parameters used to control restricted dialog in accordance with the teachings of the invention.
Figure 4B:
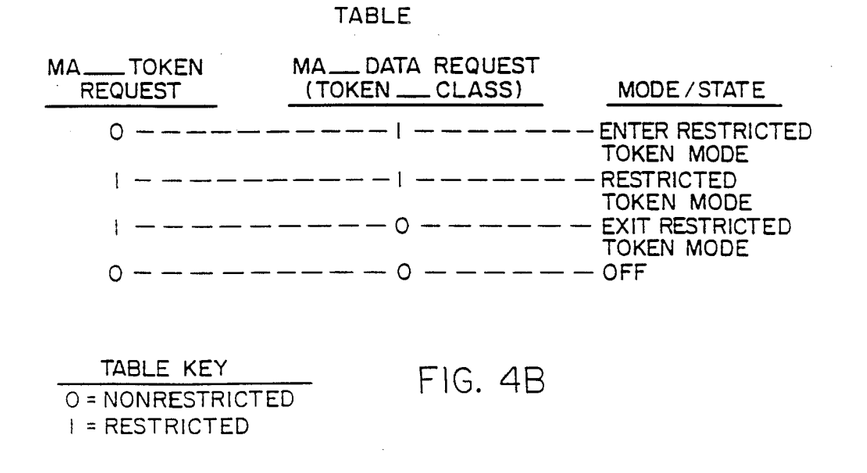
FIG. 4(b) is a table illustrating various possible settings for service primitives and the state assigned for each pair of settings.

To facilitate restricted operation logic may be added to the MAC to manipulate the MA_TOKEN request and MA_DATA request (token class) parameters. FIG. 4 illustrates the state machine that controls these parameters. The machine is shown to have four states: OFF, Enter Restricted Token Mode, Restricted Token Mode, and Exit Restricted Token Mode. The various settings of MA_TOKEN request and MA_DATA request (token class), are also shown in FIG. 4 for each state. Node processor software may be used to cause MAC 101 to enter any given state by issuing an instruction to the MAC using well known software techniquest. The OFF state is the default setting for the MAC and is entered upon reset.

An initiating station wishing to enter a restricted dialog waits until it's asynchronous queue is cleared. Messages addressed to each participant in the restricted dialog are placed on the asynchronous queue. These messages inform the participants that they may enter into restricted dialog. The initiator then sets it's MAC to the Enter Restricted Token Mode state and issues an instruction to transmit the asynchronous queue. The table associated with FIG. 4 shows the Enter Restricted Token Mode state defined as MA_TOKEN. request =0 and MA_DATA.request (token_class)=1, where 0 is defined as non-restricted and 1 is defined as restricted. The various possible settings for the service primitives and the state assigned for each pair of settings is also shown in FIG. 4. Obviously, the particular settings chosen are for the sake of illustration only and can be varied without departing from the scope or spirit of the invention.

The initiators' frames will be transmitted on the first unrestricted token opportunity. After their transmission, a restricted token is released. The initiator's MAC will automatically enter the Restricted Token Mode State when the token is issued. This will allow the initiator to capture subsequent restricted tokens for asynchronous transmission. Eventually, the participating stations will parse the message received from the initiator indicating successful entry into restricted token operation. At this point, the participants can directly force their MAC's to the Restricted Token Mode state via well known software techniques (e.g. issuing an instruction).

According to one embodiment of the invention, at the end of the restricted dialog the participants send a message to the terminating station indicating they are leaving restricted token mode. As soon as the message is sent, the participant programs the MAC to the OFF state. Once the terminating station receives the final messages from the participants, it queues a final asynchronous frame and programs the Exit Restricted Token Mode state of the MAC. The restricted token is captured, the message is transmitted and an unrestricted token is issued.

As indicated hereinbefore, to insure that the timer is reset at each station on the ring, at least one participant must guarantee that a frame is queued for transmission on each token rotation. The RBC/DPC linked list scheme described hereinbefore with reference to FIG. 3 helps facilitate this requirement.

Again, as may be seen with reference to FIG. 3 and the preceeding description thereof, when a station queues frames for transmission, a linked list is contructed in the buffer memory. A pointer at the end of each frame points to the descriptor of the next frame. As previously indicated, the two bits MORE and XDONE can be used to control the transmission. The MORE bit is set to indicate that another frame is present on the linked list, while the XDONE bit can be set to deassert the media request input to the MAC. If the media is no longer requested by DPC 125, MAC 101 will release the token.

Figure 5:
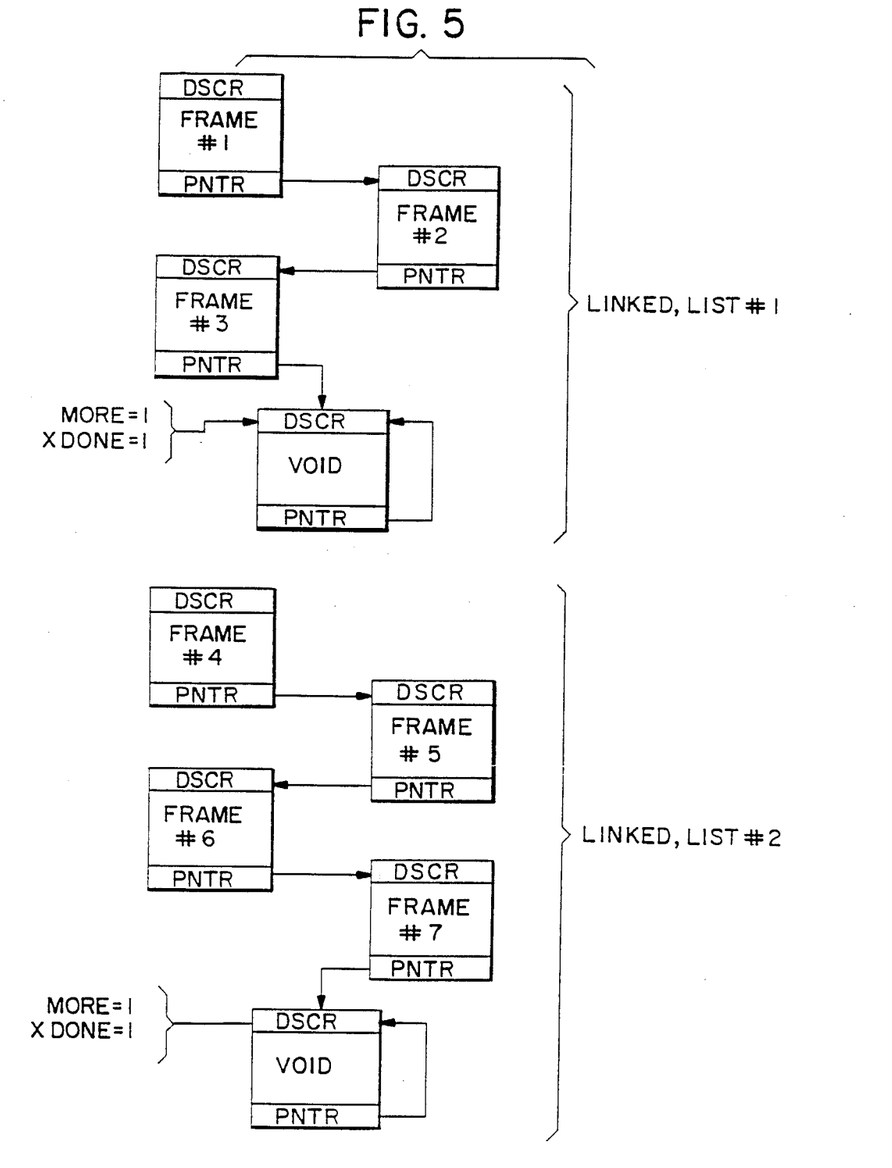
FIG. 5 depicts a linked list that can be constructed on the asynchronous queue of the station depicted in FIG. 1 to facilitate data transmission during restricted operations.
Figure 6:
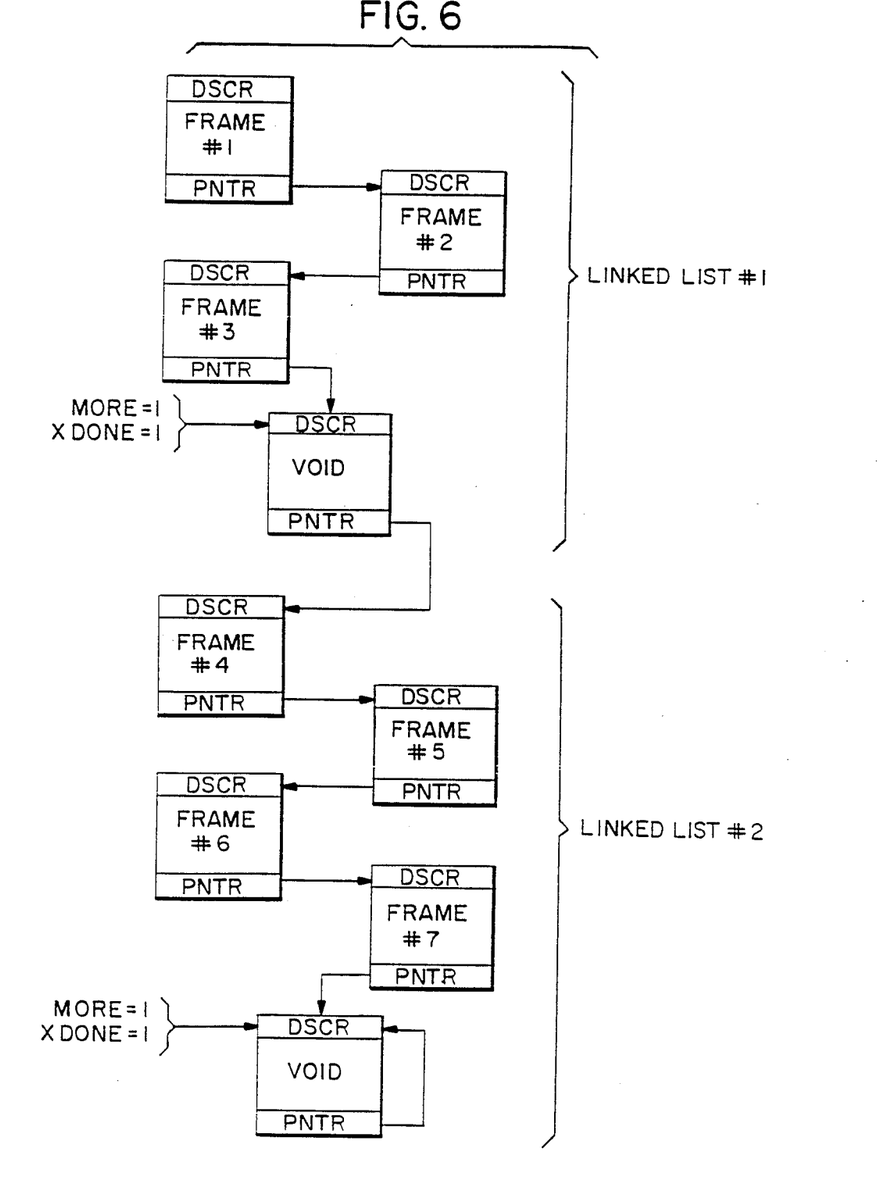
FIG. 6 depicts the linked list method of adding frames to the queue depicted in FIG. 5.

To transmit during restricted operation, linked lists can be constructed on the asynchronous queue as shown in FIGS. 5 and 6. Linked list number 1 shows three frames queued for transmission. A void frame is queued as the last member in the chain. The pointer of the void frame is loaded with the address of the void to form a loop. MORE is set, indicating another frame on the chain and XDONE is set to force token release on each void transmission.

Once linked list number 1 is created, the processor can issue an instruction to the DPC to transmit the asynchronous queue. The MAC will attempt to capture the next available token. Meanwhile, the processor can begin to construct linked list number 2. The station is guaranteed to transmit at least one frame in the interim, since the void is queued in an infinite loop. Since XDONE is set, the MAC will release the token on each void transmission.

After link list number 2 is constructed, the processor can add frames 4, 5, 6 and 7 to the queue by modifiying the pointer at the end of the first void. This pointer is updated to the address of the frame 4 descriptor. Again, a "looping" void is located at the end of the chain to insure transmission on each token.

According to the preferred embodiment of the invention, to reduce the bandwidth used for transmitting voids, it is desirable to have only one station execute the procedure set forth above. This can be achieved by having only the restricted dialog initiator execute this void queueing method.

The foregoing description of a preferred embodiment of the novel methods and apparatus for achieving the objects of the invention has been presented for purposes of illustration and description. It is not intended to be exhaustive or to limit the invention to the precise form disclosed, and obviously many modifications and variations are possible in light of the above teaching.

The embodiment and examples set forth herein were presented in order to best explain the principles of the instant invention and its practical application to thereby enable others skilled in the art to best utilize the instant invention in various embodiments and with various modifications as are suited to the particular use contemplated.

It is intended that the scope of the instant invention be defined by the claims appended hereto.

What is claimed is:

1. A method for performing restricted token operations on an FDDI ring network that includes a plurality of stations which communicate with one another via said ring, utilizing a timed token protocol in which both restricted and nonrestricted token types are defined and that further includes media access control means associated with each station that supports both restricted and nonrestricted token types, comprising the steps of:
    (a) requesting, via an initiating first one of said plurality of stations, restricted dialog with preselected participant stations attached to said ring;
    (b) addressing messages to said preselected participant stations via said first station, to thereby inform said preselected participant stations that they may enter into said restricted dialog;
    (c) storing said messages in an asynchronous queue associate with said first station;
    (d) setting, via said first station, the media access control means, associated with said first station, to support restricted token operations, by switching said media access control means from an initial OFF state to an Enter Restricted Token Mode state;
    (e) transmitting, upon completion of said step of setting, the messages stored in said asynchronous queue on the occurrence of the next unrestricted token available to said first station;

(f) releasing a restricted token at the conclusion of the transmission of the messages stored in said queue to thereby cause said media access control means to enter into a Restricted Token Mode state and to further enable said first station to capture restricted tokens for asynchronous transmission and release a restricted token at the end of each data transmission associated with a given token capture; and (g) communicating successful entry into said Restricted Token Mode state to said participant stations whereupon each participant station forces its associated media access control means to enter the Restricted Token Mode state.

2. A method as set forth in claim 1 further comprising the step of inhibiting resetting of a timing means in each of said media access control means in order to prevent improper conversion and reconversion of token types due to a specific level of noise.

3. A method as set forth in claim 2 wherein at least one of said plurality of stations included in said restricted dialog transmits a frame on each rotation of the token when in said Restricted Token Mode state, to thereby prevent premature ring recovery.

4. A method as set forth in claim 2 wherein said step of inhibiting is performed by executing a void queuing procedure.

5. A method as set forth in claim 1, for terminating restricted token operations and returning said FDDI ring to normal operations, further comprising the step of disabling, via a preselected one of said participant stations designated as a terminator station, the ability of all of said participant stations to capture restricted tokens.

6. A method as set forth in claim 5 wherein said step of disabling is performed by said preselected station issuing an unrestricted token.

7. A method as set forth in claim 1 wherein said step of requesting further comprises the step of clearing the asynchronous queue of said initiating station prior to addressing messages to said participant stations.

8. A method as set forth in claim 1 wherein said step of communicating further comprises the steps of:
 (a) parsing messages received from said first station at each participant station to which a message has been addressed; and
 (b) switching the media access controller associated with each participant station to which a message has been addressed to said Restricted Token Mode state.

9. A method as set forth in claim 8 further comprising the (a) transmitting, from each participant station to a terminator station, a message indicating completion of a given participant station's restricted dialog; and
 (b) switching the media access controller associated with each participant station that has completed restricted dialog to the OFF state.

10. A method as set forth in claim 9 further comprising the steps of:
 (a) queuing a final asynchronous frame at said terminator station;
 (b) switching the media access controller associated with said terminator station to an Exit Restricted Token mode state;
 (c) capturing the next restricted token after entering the Exit Restricted Token Mode state;
 (d) transmitting said final asynchronous frame; and (e) issuing an unrestricted token thereby terminating restricted token operations and returning said FDDI ring to normal operations.

11. Apparatus for performing restricted token operations on an FDDI token ring network wherein said network includes a set of stations, each of which has associated media access control means further including timing means, and further wherein each of said media access control means is capable of supporting restricted and nonrestricted token operations as well as the transmission of both synchronous and asynchronous data, comprising:
 (a) means for clearing an asynchronous queue of a first one of said stations designated as the initiator station;
 (b) means for selectively including stations in a restricted dialog as participant stations by addressing a message to each such station and storing each such message in said asynchronous queue;
 (c) means for switching the media access controller associated with said initiator station from an OFF state to an Enter Restricted Token Mode state;
 (d) means for transmitting the messages stored in said asynchronous queue on the first unrestricted token opportunity following the initiator station having been switched to the Enter Restricted Token Mode state; and
 (e) means for releasing a restricted token upon completion of transmitting the messages stored in said asynchronous queue and for switching the media access controller associated with said initiator station to a Restricted Token Mode state to thereby allow the initiator station to capture subsequent restricted tokens for asynchronous transmission.

12. Apparatus as set forth in claim 11 wherein each of said participant stations further comprises:
 (a) means for parsing messages received from said initiator station; and
 (b) means for switching the media access controller associated with each of said stations to a Restricted Toke Mode state.

13. Apparatus as set forth in claim 12 further comprising:
 (a) means for transmitting a message, to a station designated as a terminator station, indicating that a given participant station has completed restricted dialog; and
 (b) means for switching the media access controller associated with each participant station that has completed restricted dialog to an OFF state.

14. Apparatus as set forth in claim 12 further comprising:
 (a) media access control means, located at a station designated as a terminator station, including means for exiting from restricted token dialog independent of programming by said participant stations.

15. Apparatus as set forth in claim 13 wherein said terminator station further comprises:
 (a) means for queuing a final asynchronous frame;
 (b) means for switching the media access controller of said terminator station to an Exit Restricted Token Mode state;
 (c) means for capturing a restricted token and transmitting said final asynchronous frame; and
 (d) means for issuing an unrestricted token upon transmission of said final asynchronous frame thereby returning the FDDI ring to normal operations.

16. Apparatus as set forth in claim 11 further comprising means for inhibiting resetting of a timer means in order to prevent improper conversion and reconversion of token types due to a specific level of noise.

17. Apparatus as set forth in claim 11 further comprising means for transmitting a frame on each rotation of the token when in the Restricted Token Mode state, to thereby prevent premature ring recovery.

18. Apparatus as set forth in claim 11 further comprising means for executing a void queing procedure.

19. Apparatus for performing restricted token operations on an FDDI token ring network wherein said network includes a set of stations, each of which has associated media access control means further including timing means, and further wherein each of said media access control means is capable of supporting restricted and nonrestricted token operations as well as the transmission of both synchronous and asynchronous data, comprising:
   (a) means for initiating restricted token ring operations and for selectively including stations in a restricted dialog as participant stations;
   (b) means for permitting said means for initiating to asynchronously transmit messages to said participant stations;
   (c) means for enabling a first one of said stations to capture restricted tokens for asynchronous transmission; and
   (d) means for forcing the media access controller associated with each of said participant stations to enter a restricted token mode state.

20. A media access controller which supports both restricted and nonrestricted token operations in an FDDI network wherein said controller has an OFF state, an Enter Restricted Token Mode state, a Restricted Token Mode state and an Exit Restricted Token Mode state comprising:
   (a) means for receiving a first primative that defines the class of token that can be captured for the purposes of transmitting asynchronous data; and
   (b) means for receiving a second primative at the end of each transmit request that specifies the type of token that will be issued at the end of a transmission.

21. A media access controller as set forth in claim 20, wherein unrestricted token operations are supported when said controller is in said OFF state and restricted token operations are supported when said controller is in said Restricted Token Mode state.

22. A media access controller as set forth in claim 20 wherein said controller is in a transitional state between supporting nonrestricted followed by restricted token operations when in said Enter Restricted Token Mode state and said controller is in a transitional state between supporting restricted token operations followed by nonrestricted token operations when in said Exit Restricted Token Mode state.

23. A method as set forth in claim 1, wherein a frame is queued for transmission on each token rotation by at least one of said participant stations, comprising the further steps of:
   (a) constructing a linked list in buffer memory whenever a station queues a set of frames for transmission;
   (b) including a pointer at the end of each of said set of frames which points to a set of at least two transmission control bits located within the next frame to be transmitted, wherein a first one of said control bits, when set, indicates another frame is present on the linked list and a second one of said control bits, when set, causes the media access controller to release a token; and
   (c) utilizing at least one station to execute a void queuing procedure to insure a transmission on each token when in a restricted token mode.

* * * * *